US 7,504,466 B2

(12) United States Patent
Devonport et al.

(10) Patent No.: US 7,504,466 B2
(45) Date of Patent: Mar. 17, 2009

(54) HIGH SOLIDS PREPARATION OF CROSSLINKED POLYMER PARTICLES

(75) Inventors: Wayne Devonport, Doylestown, PA (US); Susan J. Fitzwater, Ambler, PA (US); Eric G. Lundquist, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 667 days.

(21) Appl. No.: 11/244,457

(22) Filed: Oct. 6, 2005

(65) Prior Publication Data

US 2006/0094830 A1    May 4, 2006

Related U.S. Application Data

(60) Provisional application No. 60/624,905, filed on Nov. 4, 2004.

(51) Int. Cl.
*C08F 120/18* (2006.01)

(52) U.S. Cl. ............... 526/329.7; 526/258; 526/280; 526/223; 526/318.2

(58) Field of Classification Search ............ 526/329.7, 526/258, 280, 223, 318.2
See application file for complete search history.

(56) References Cited

U.S. PATENT DOCUMENTS

| | | | |
|---|---|---|---|
| 4,340,511 A | 7/1982 | Backhouse et al. | |
| 4,403,003 A | 9/1983 | Backhouse | |
| 4,539,363 A | 9/1985 | Backhouse | |
| 4,777,213 A | 10/1988 | Kanda et al. | |
| 4,880,859 A | 11/1989 | Slongo et al. | |
| 4,880,889 A | 11/1989 | Jung et al. | |
| 4,894,399 A | 1/1990 | Rody et al. | |
| 5,021,525 A | 6/1991 | Montague et al. | |
| 5,346,958 A | 9/1994 | Yukawa et al. | |
| 5,621,058 A | 4/1997 | Kondo et al. | |
| 5,650,473 A | 7/1997 | Kimpton et al. | |
| 5,681,889 A | 10/1997 | Kondo et al. | |
| 5,711,940 A | 1/1998 | Kuentz et al. | |
| 5,756,573 A | 5/1998 | Trumbo et al. | |
| 5,863,996 A * | 1/1999 | Graham ..................... 526/216 |
| 5,962,574 A | 10/1999 | Jackson et al. | |
| 5,986,020 A | 11/1999 | Campbell et al. | |
| 6,028,135 A | 2/2000 | Keller et al. | |
| 6,300,443 B1 | 10/2001 | Solomon et al. | |
| 6,368,239 B1 | 4/2002 | Devonport et al. | |
| 6,372,820 B1 | 4/2002 | Devonport | |
| 6,437,050 B1 | 8/2002 | Krom et al. | |
| 6,545,095 B1 | 4/2003 | Solomon et al. | |
| 6,551,393 B2 | 4/2003 | Devonport et al. | |
| 6,586,097 B1 * | 7/2003 | Pascault et al. ............. 428/402 |
| 6,646,068 B2 | 11/2003 | Chisholm et al. | |
| 6,852,158 B2 | 2/2005 | Belmont et al. | |
| 6,858,299 B2 | 2/2005 | Lundquist et al. | |
| 2002/0098144 A1 | 7/2002 | Devonport et al. | |
| 2003/0232914 A1 | 12/2003 | Devonport et al. | |
| 2004/0063809 A1 | 4/2004 | Fu et al. | |
| 2004/0063817 A1 | 4/2004 | Ilenda et al. | |

FOREIGN PATENT DOCUMENTS

| | | |
|---|---|---|
| EP | 0 021 618 A1 | 1/1981 |
| EP | 0 0687 716 B1 | 12/1995 |
| EP | 1 371 667 A | 12/2003 |
| EP | 1 411 076 A | 4/2004 |
| EP | 1 484 355 A | 12/2004 |

* cited by examiner

*Primary Examiner*—Ling-Siu Choi
(74) *Attorney, Agent, or Firm*—Thomas S. Deibert

(57) ABSTRACT

A process for preparing crosslinked polymer particles at high solids levels (i.e., >40 wt %). Also provided is a method for predicting whether a selection of reaction conditions for preparing crosslinked polymer particles will exhibit a potential for forming a gel and a method for predicting whether a selection of reaction conditions will or will not result in the formation of a gel.

5 Claims, No Drawings

HIGH SOLIDS PREPARATION OF CROSSLINKED POLYMER PARTICLES

This is a non-provisional application of prior U.S. Provisional Application Ser. No. 60/624,905 filed on Nov. 4, 2004.

The present invention relates to a process for preparing crosslinked polymer particles at high solids levels (i.e., >40 wt %). The present invention also provides a method for predicting whether a selection of reaction conditions for preparing crosslinked polymer particles will exhibit a potential for forming a gel. The present invention also provides a method for predicting whether a selection of reaction conditions will or will not result in the formation of a gel.

Crosslinked polymer particles having a mean particle diameter of ≦100 nm continue to attract attention for use in a variety of applications. Compared to conventional compounds, such crosslinked polymer particles often exhibit improved mechanical strength, greater controllability of transport properties, greater material property adjustability and increased dimensional stability. As a result, these crosslinked polymer particles offer utility in a variety of applications including, for example, catalysis, coating, pharmaceutical (e.g., controlled release), biostructural filler, electronic composite and polymeric composite.

A number of conventional processes exist that may be used to prepared crosslinked polymer particles having a mean particle diameter of ≦100 nm including, for example, solution polymerization and dispersion polymerization techniques. Such conventional processes, however, produce these crosslinked polymer particles at low solids levels. To economically manufacture crosslinked polymer particles, it would be desirable to do so at relatively high solids levels to improve the process efficiency.

Emulsion polymerization techniques also exist for preparing crosslinked polymers. Emulsion polymers typically exhibit a particle size of greater than 50 nm. Also, emulsion polymerization techniques conventionally make use of dispersing agents such as surfactants. The use of these surfactants can create performance problems in the end use applications for the crosslinked polymers. For example, the use of surfactants to prepare crosslinked polymers can lead to decreased water fastness and scrub resistance in a coating composition into which the crosslinked polymers are incorporated.

One approach for providing crosslinked polymer particles in the absence of surfactants (i.e., emulsion free) is disclosed by Pascault et al. in U.S. Pat. No. 6,586,097. Pascault et al. disclose a dispersion polymerization process for preparing crosslinked microparticles between 10 and 300 nm in a non-aqueous medium which is a non-solvent for the polymer formed, of a composition of ethylenically unsaturated polymerizable compounds comprising:

at least one monomer A, comprising only one ethylenic unsaturation, giving the microparticles formed in the said non-aqueous medium self-stabilization during and after the polymerization, without any addition of polymer having the function of a stabilizing agent, either before, during or after polymerization, at least one compound B comprising at least two ethylenic unsaturations and optionally, depending on the case:

at least one compound C comprising only one ethylenic unsaturation and/or at least one compound D which is different from A, B and C and comprising at least one ethylenic unsaturation which can undergo radical-mediated polymerization and at least one second reactive function f1 which is other than an ethylenic unsaturation.

Pascault et al., however, only disclose making the crosslinked polymer particles at a solids level of about 25 wt %.

Accordingly, there remains a need for an economical process for making crosslinked polymer particles having a mean diameter of ≦100 nm at a solids level of >40 wt %. There is also a need for a means for predicting whether a given set of reaction conditions exhibit the potential for forming a gel, rather than crosslinked polymer particles.

In one aspect of the present invention, there is provided a method for predicting whether a selection of reaction conditions for a polymerization reaction for forming crosslinked polymer particles exhibit a potential for forming a gel; wherein the reaction conditions include a reaction mixture comprising at least one reactant monomer and at least one crosslinking monomer; wherein the at least one reactant monomer is selected from alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof; wherein the reaction conditions are selected to provide a polymerization reaction that is emulsion free; the method comprising:

a) predicting whether equation (1) will be satisfied at some point during the polymerization reaction given the selection of reaction conditions:

$$2.18 < A*B*C < 2.9 \tag{1}$$

wherein

A is the total fraction of potential pendant double bonds defined according to equation 2:

$$A = 100*(\text{overall mole fraction of cross linking monomer})*(N-1); \tag{2}$$

where N is the number of polymerizable double bonds per cross linking monomer;

B is the moles of standing monomer per kg of reaction mixture; and,

C is the overall mole fraction of methacrylate monomers, vinyl aromatic monomers, methacrylamide monomers, norbornene monomers and substituted norbornene monomers in the reaction mixture.

In another aspect of the present invention, there is provided a method for predicting whether a selection of reaction conditions for a polymerization reaction will not result in the formation of a gel; wherein the reaction conditions include a reaction mixture comprising at least one solvent, at least one reactant monomer and at least one crosslinking monomer; wherein the at least one reactant monomer is selected from alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof; wherein the reaction conditions are selected to provide a polymerization reaction that is emulsion free and that produces crosslinked polymer particles; the method comprising:

a) predicting whether equation (1) will be satisfied throughout the polymerization reaction given the selection of reaction conditions:

$$A*B*C < 2.18; \tag{1}$$

wherein
  A is the total fraction of potential pendant double bonds defined according to equation 2:

A=100*(overall mole fraction of cross linking monomer)*(N−1);  (2)

where N is the number of polymerizable double bonds per cross linking monomer;
  B is the moles of standing monomer per kg of reaction mixture; and,
  C is the overall mole fraction of methacrylate monomers, vinyl aromatic monomers, methacrylamide monomers, norbornene monomers and substituted norbornene monomers in the reaction mixture.

In another aspect of the present invention, there is provided a method for predicting whether a selection of reaction conditions for a polymerization reaction will result in forming a gel; wherein the reaction conditions include a reaction mixture comprising at least one reactant monomer and at least one crosslinking monomer; wherein the at least one reactant monomer is selected from alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof; wherein the reaction conditions are selected to provide a polymerization reaction that is emulsion free and that produces crosslinked polymer particles; the method comprising:

a) predicting whether equation (1) will be satisfied throughout the polymerization reaction given the selection of reaction conditions:

$A*B*C>2.9$;  (1)

wherein
  A is the total fraction of potential pendant double bonds defined according to equation 2:

A=100*(overall mole fraction of cross linking monomer)*(N−1);  (2)

where N is the number of polymerizable double bonds per cross linking monomer;
  B is the moles of standing monomer per kg of reaction mixture; and,
  C is the overall mole fraction of methacrylate monomers, vinyl aromatic monomers, methacrylamide monomers, norbornene monomers and substituted norbornene monomers in the reaction mixture.

In another aspect of the present invention, there is provided a use of the prediction methods of the present invention to select reaction conditions for a polymerization reaction.

In another aspect of the present invention, there is provided a process for preparing crosslinked polymer particles comprising adding a solvent and reactants to a vessel to form a reaction mixture and reacting the reactants to form the crosslinked polymer particles; wherein the solvent is selected from hydrocarbons, halohydrocarbons, aromatic hydrocarbons, ethers, esters, water, alcohols and mixtures thereof; wherein the reactants include at least one reactant monomer and at least one crosslinking monomer; wherein the at least one reactant monomer is selected from alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof; wherein the at least one crosslinking monomer is selected from pentaerythritol tetraacrylate, trimethylolpropane triacrylate (TMPTA), trimethylolpropane trimethacrylate (TMPTMA), diethylene glycol diacrylate, diethylene glycol dimethacrylate, triethylene glycol diacrylate and triethylene glycol dimethacrylate; wherein the reactants are feed to the vessel gradually over a period of at least 30 minutes; wherein the crosslinked polymer particles have a mean particle diameter of ≦50 nm; wherein the process yields a solids level of crosslinked polymer particles >40 wt %; and wherein the process is emulsion free.

In another aspect of the present invention, there is provided a process for preparing crosslinked polymer particles comprising adding a solvent and reactants to a vessel to form a reaction mixture and reacting the reactants to form crosslinked polymer particles; wherein the solvent is selected from hydrocarbons, halohydrocarbons, aromatic hydrocarbons, ethers, esters, water, alcohols and mixtures thereof; wherein the reactants comprise at least one reactant monomer and at least one crosslinking monomer; wherein the selection of the reactants and the process conditions are such that equation (1) is satisfied throughout the process:

$A*B*C<2.18$  (1)

wherein
  A is the total fraction of potential pendant double bonds defined according to equation 2:

A=100*(overall mole fraction of cross linking monomer)*(N−1);  (2)

where N is the number of polymerizable double bonds per cross linking monomer in the reactant monomers;
  B is the moles of standing monomer per kg of reaction mixture; and,
  C is the overall mole fraction of methacrylate monomers, vinyl aromatic monomers, methacrylamide monomers, norbornene monomers and substituted norbornene monomers in the reaction mixture;

wherein the at least one reactant monomer is selected from alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof; wherein the at least one crosslinking monomer is selected from pentaerythritol tetraacrylate, trimethylolpropane triacrylate (TMPTA), trimethylolpropane trimethacrylate (TMPTMA), dietheylene glycol diacrylate, dietheylene glycol dimethacrylate, trietheylene glycol diacrylate and trietheylene glycol dimethacrylate; wherein the reactants are feed to the vessel gradually over a period of at least 30 minutes; wherein the crosslinked polymer particles have a mean particle diameter of ≦50 nm; wherein the process yields a solids level of crosslinked polymer particles >40 wt %; and wherein the process is emulsion free.

All ranges defined herein are inclusive and combinable.

The term "emulsion" used herein and in the appended claims means a stable mixture of two or more immiscible liquids held in suspension by a small percentage of an emulsifier.

The term "gel" used herein and in the appended claims means a polymer exhibiting a weight average molecular weight, $M_w$, of $\geq 10,000,000$.

In some embodiments, the methods of the present invention may involve a solution polymerization, a dispersion polymerization, a suspension polymerization or a precipitation polymerization.

The term "solution polymerization" used herein and in the appended claims means a polymerization that takes place in a solvent for the polymer.

The term "solvent for the polymer" used herein and in the appended claims means that a linear random (co)-polymer having substantially similar polymerized monomer units to those present in a given composition of crosslinked polymer particles would be soluble or would swell in the solvent.

The term "dispersion polymerization" used herein and in the appended claims means a polymerization that takes place in a solvent such that the polymer produced is insoluble, but nevertheless remains as a homogeneous phase through, for example, electrostatic or steric stabilization.

The term "suspension polymerization" used herein and in the appended claims means a polymerization that takes place in a solvent such that the polymer produced is insoluble, but nevertheless remains as a stable two phase system through, for example, electrostatic or steric stabilization.

The term "precipitation polymerization" used herein and in the appended claims means a polymerization that takes place in a solvent such that the polymer produced is insoluble.

The term "standing monomer" used herein and in the appended claims means unreacted monomers present in a reaction vessel during a polymerization process. Standing monomers are sometimes referred to as "in-process monomers" and are usually expressed as a percent or ppm of the reaction mixture.

The standing monomer concentration present in a reaction vessel during a polymerization process depends on a variety of process parameters including, for example, the reactant monomer feed rate, the reactant monomer composition, the initiator level, the level of crosslinking monomer, the solvent, the temperature and the pressure. The selection of these process parameters will be dependent on, for example, the desired crosslinked polymer particle composition, mean particle diameter and solids level in the product solution. Of course, not all desirable combinations of process parameters and product properties are compatible. That is, everything else being equal, it would often be desirable to produce crosslinked polymer particles at high solids (i.e., >40 wt %). Notwithstanding, many combinations of process conditions will not be conducive to the production of crosslinked polymer particles at high solids. That is, many combinations of process conditions will lead to the production of a gel, rather than crosslinked polymer particles. Hence, the desirability for a means for predicting whether a given set of process conditions will result in the potential for forming a gel.

In some embodiments, the methods of the present invention may involve the use of techniques such as free radical, anionic, cationic, metal catalyzed and condensation polymerization mechanisms.

In some embodiments of the methods of the present invention, free radical initiators may be included in the reaction mixture. Free radical initiators suitable for use with the present invention may include, for example, peroxyesters, dialkylperoxides, alkylhydroperoxides, persulfates, azoinitiators, redox initiators and combinations thereof; alternatively, benzoyl peroxide, t-butyl peroctoate, t-amyl peroxypivalate, cumene hydroperoxide, azoisobutylnitrile, 2,2'-azobis(2-methylbutanenitrile) and combinations thereof. In some embodiments, the amount of free radical initiator in the reaction mixture may range from 0.05 to 10 wt % (based on the total weight of reactant monomer and crosslinking monomer).

In some embodiments of the methods of the present invention, anionic initiators may be included in the reaction mixture. Anionic initiators suitable for use with the present invention may include, for example, organo-lithiums, organo-sodiums, organo-potassiums, Grignard reagents and combinations thereof; alternatively, butyl lithium, sodium naphthalide, liquid ammonia, potassium amide, potassium t-butoxide, potassium metal, amyl sodium and combinations thereof; alternatively butyl lithium. In some embodiments, the amount of anionic initiator in the reaction mixture may range from 0.05 to 10 wt % (based on the total weight of reactant monomer and crosslinking monomer).

In some embodiments of the methods of the present invention, cationic initiators may be included in the reaction mixture. Cationic initiators suitable for use with the present invention may include, for example, protonic acids, Lewis acids, compounds capable of generating cations, ionizing radiation or combinations thereof; alternatively, hydrochloric acid, methanesulfonic acid, boron triflouride, aluminum trichloride, tin chloride, tin bromide, antimony chloride, titanium (IV) chloride, zirconium dichloride, zirconium tetrachloride, iodine and combinations thereof; alternatively aluminum trichloride. In some embodiments the amount of cationic initiator in the reaction mixture may range from 0.05 to 10 wt % (based on the total weight of reactant monomer and crosslinking monomer).

In some embodiments of the methods of the present invention, metal catalyzed polymerization initiators may be included in the reaction mixture. Metal catalyzed polymerization initiators suitable for use with the present invention may include, for example, bis(tricyclohexylphosphene)benzylidine ruthenium (IV) dichloride; 2,6-diisopropylphenylimidonephylidene [(S)=BIPHEN]molybdenum (VI) (Schrock-Hoveyda catalyst); 2,6-diisopropylphenylimidonephylidene molybdenum (VI) bis(t-butoxide); 2,6-diisopropylphenylimidonephylidene (IV) bis(hexafluoro-t-butoxide) (Schrock catalyst); and combinations thereof. In some embodiments, the amount of metal catalyzed polymerization initiator in the reaction mixture may range from 0.05 to 10 wt % (based on the total weight of reactant monomer and crosslinking monomer).

In some embodiments of the methods of the present invention, catalysts may be included in the reaction mixture. For example, when the reaction mechanism is condensation polymerization, a reaction mixture may contain a catalyst including, for example, acids, bases, metal acetate salts and alkali metals. Acid catalysts may include, for example, hydrochloric acid, p-toluenesulfonic acid, methylenesulfonic acid and camphorsulfonic acid. Base catalysts may include, for example, metal alkoxides such as sodium methoxide and potassium methoxide. Metal acetate salt catalysts may include, for example, cadmium acetate, zinc acetate, lead acetate, cobalt acetate, barium acetate and magnesium acetate. Alkali metal catalysts may include, for example, sodium and potassium. In some embodiments, the amount of catalyst in the reaction mixture may range from 0.05 to 10 wt % (based on the total weight of reactant monomer and crosslinking monomer).

In some embodiments, the reaction mixture may include inorganic particles. Inorganic particles suitable for use with the present invention may include, for example, clays (both synthetic and natural), silica (colloidal, fumed, amorphous), silica sols, titanium dioxide, metals (e.g., alumina, zirconia), metal oxides (e.g., cesium oxide, alumina oxide, yttrium oxide, antimony oxide), metal nitrides, inorganic pigments, metal carbides, metal sulfides, metal silicates, metal borides, metal carbonates, zeolites and carbon nanotubes. In some embodiments, the mean particle diameter of the inorganic particles in the reaction mixture is, for example, between 1 and 1,000 nm; alternatively between 1 and 50 nm; alternatively between 1 and 40 nm; alternatively $\leq$30 nm; alternatively $\leq$25 nm; alternatively $\leq$10 nm; alternatively $\leq$8 nm; alternatively $\leq$4 nm.

In some embodiments, the reaction mixture may include inorganic precursors. Inorganic precursors suitable for use with the present invention may include, for example, organosilanes, organic zirconates, organotitanates, metal alkoxides, metal diketonates and metal carboxylates.

In some embodiments of the methods of the present invention, chain transfer agents may be included in the reaction mixture. Chain transfer agents suitable for use with the present invention may include, for example, alkyl mercaptans, phosphorous acids, aromatic hydrocarbons with activated hydrogens, alkyl halides, alcohols and mixtures thereof; alternatively dodecyl mercaptan, toluene, bromotrichloromethane, isopropanol and mixtures thereof.

In some embodiments of the methods of the present invention, the at least one reactant monomer may be selected from, for example, alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof; alternatively, the at least one reactant monomer may be selected from alkyl (meth)acrylates, (meth)acrylamides, alkenyl (meth)acrylates, aryl (meth)acrylates, alkylaryl (meth)acrylates, amine containing (meth)acrylates, phosphorous containing (meth)acrylates, sulfur containing (meth)acrylates, (meth)acrylic acid, vinyl imidazole and combinations thereof; alternatively the at least one reactant monomer may be selected from alkyl (meth)acrylates, (meth)acrylamides, alkenyl (meth)acrylates, aryl (meth)acrylates, alkylaryl (meth)acrylates, amine containing (meth)acrylates, phosphorous containing (meth)acrylates, sulfur containing (meth)acrylates, (meth)acrylic acid and combinations thereof; alternatively the at least one reactant monomer may be selected from alkyl (meth)acrylates, alkenyl (meth)acrylates, aryl (meth)acrylates, alkylaryl (meth)acrylates, amine containing (meth)acrylates, phosphorous containing (meth)acrylates, sulfur containing (meth)acrylates, (meth)acrylic acid and combinations thereof.

In some embodiments of the methods of the present invention, the solvent may be selected from aqueous and non-aqueous solvent systems and combinations thereof. Solvents suitable for use with the present invention may include, for example, hydrocarbons, halohydrocarbons, aromatic hydrocarbons, ethers, esters, water, alcohols and mixtures thereof; alternatively, the solvent may be selected from esters, ethers, alcohols, water and mixtures thereof; alternatively, the solvent may be selected from esters, alcohols, water and mixtures thereof; alternatively, the solvent may be selected from dodecane, decane, mesitylene, xylenes, diphenyl ether, ethyl acetate, ethyl lactate, propyleneglycol monomethyl ether acetate, propyleneglycol monomethyl ether, alkyl-alcohols and mixtures thereof; alternatively, the solvent may be selected from toluene, xylenes, ethyl acetate, butyl acetate, ethyl lactate, propyleneglycol monomethyl ether acetate, propylenegylcol monomethyl ether, alkyl alcohols, water and mixtures thereof; alternatively, the solvent may be selected from isopropanol and mixtures of isopropanol with water.

In some embodiments of the methods of the present invention, the at least one crosslinking monomer may be selected from, for example, pentaerythritol tetraacrylate, trimethylolpropane triacrylate (TMPTA), trimethylolpropane trimethacrylate (TMPTMA), diethylene glycol diacrylate, diethylene glycol dimethacrylate, triethylene glycol diacrylate and triethylene glycol dimethacrylate; alternatively, the at least one crosslinking monomer may be selected from TMPTA, diethylene glycol diacrylate, diethylene glycol dimethacrylate; alternatively, the at least one crosslinking monomer may be TMPTA.

In some embodiments of the methods of the present invention, the predicted or actual crosslinked polymer particles may exhibit a mean particle diameter of $\leq$100 nm; alternatively $\leq$50 nm; alternatively $\leq$40 nm; alternatively $\leq$35 nm; alternatively $\leq$30 nm; alternatively $\leq$25 nm; alternatively $\leq$20 nm; alternatively $\leq$15 nm; alternatively $\leq$10 nm; alternatively $\leq$8 nm; alternatively $\leq$5 nm; alternatively $\leq$4 nm; alternatively $\leq$2 nm; alternatively $\leq$1 nm.

The mean particle diameter of crosslinked polymer particles of the present invention may be determined using analytical techniques including, for example, standard dynamic light scattering, small angle neutron scattering, NMR diffusion, X-ray scattering and gel permeation chromatography.

Gel permeation chromatography (GPC) elution times for the crosslinked polymer particles of the present invention may provide an indication of the mean particle diameter thereof. The size of the crosslinked polymer particles can be determined by comparing the crosslinked polymer particles with polystyrene standards having known molecular weights and hydrodynamic radii. The gel permeation chromatography technique employed compares elution times of the crosslinked polymer particles with the elution times of the polystyrene standards using a column that contains 10 micron PL gel.

In some embodiments of the prediction methods of the present invention, the predicted polymerization reaction yields may exhibit any solids level; alternatively $\geq$30 wt %; alternatively $\geq$35 wt %; alternatively $\geq$40 wt %; alternatively >40 wt %; alternatively $\geq$45 wt %; alternatively >45 wt %; alternatively >47 wt %; alternatively $\geq$50 wt %; alternatively $\geq$55 wt %; alternatively $\geq$60 wt %; alternatively $\geq$65 wt %.

In some embodiments of the preparation methods of the present invention, the actual polymerization reaction yields may exhibit a solids level of crosslinked polymer particles of >40 wt %; alternatively $\geq$45 wt %; alternatively >45 wt %; alternatively >47 wt %; alternatively $\geq$50 wt %; alternatively $\geq$55 wt %; alternatively $\geq$60 wt %; alternatively $\geq$65 wt %.

The solids level of crosslinked polymer particles may be determined by measuring the solids level of the final solution of crosslinked polymer particles produced by a preparation method of the present invention by placing a weighed sample of the final solution on a solids balance, heating the sample to 160° C. until no further volatiles are evolved and measuring the weight of the volatile non-solids material driven off. The lost weight subtracted from the initial weight divided by the initial weight multiplied by 100 will give the weight % solids level of the final solution of crosslinked polymer particles produced by the preparation method.

In some embodiments of the methods of the present invention, the simulated or actual feeds of the at least one reactant monomer and the at least one crosslinking monomer may be, for example, continuous, gradual addition, staged, timed or pulsed; alternatively, continuous or gradual addition; alternatively gradual addition.

An example of a continuous feed is a continuous addition of reactants over the course of the polymerization reaction. The composition of the continuous feed may be varied over the course of the polymerization reaction.

An example of a gradual addition feed is a gradual addition of reactants to a reaction vessel over time while the polymerization reaction is proceeding. In some embodiments, a feed comprising the at least one reactant monomer and the at least one crosslinking monomer may be fed to the reaction vessel gradually over a period of at least 30 minutes; alternatively at least 40 minutes; alternatively at least 50 minutes; alternatively at least 1 hour; alternatively at least 2 hours; alternatively at least 3 hours.

In some embodiments, the total reaction time for a polymerization process of the present invention may be, for example, two seconds to 24 hours; alternatively 1 hour to 20 hours, alternatively 1 to 3 hours; alternatively 3 to 15 hours.

An example of a pulsed feed is a pulsed addition wherein multiple additions of reactants are added to a reaction vessel where each addition is separated by a time interval where no reactant is being fed. The time interval between each addition may be the same of may be different. Also, the actual volume and composition of each addition of reactants may be the same or different.

In some embodiments, the reaction mixture in the preparation methods of the present invention may be maintained at a given temperature throughout the polymerization reaction. Alternatively, the temperature of the reaction mixture may be varied during the course of the polymerization reaction. In the preparation methods of the present invention, the reaction mixture is typically maintained at a given temperature of between −30° C. to 150° C.; alternatively between 0° C. and 120° C.; alternatively between 30° C. and 90° C.

In some embodiments of the predictive methods of the present invention, the standing monomer concentration, B, may be predicted, for example, using dynamic polymerization simulation. That is, given the reaction conditions for a subject polymerization including, the reactant monomers, the crosslinking monomers, the feed rates, the masses of all components in the reaction mixture, etc., a series of coupled differential equations may be derived to predict how the masses of the different components in the reaction mixture will change with time. These coupled differential equations may then be numerically integrated forward through time using a dynamic simulation tool such as Aspen Custom Modeler® version 11.1 (commercially available from Aspen Technology, Inc., Cambridge, Mass.) to predict the masses of the components in the reaction mixture at any time during the polymerization reaction.

An equation for the each of the inert components in the reaction mixture (e.g., solvents, other additives which do not react) is derived as follows:

$$\frac{d(\text{mass}(S))}{dt} = \text{Flow}(S) \tag{1}$$

wherein Flow(S) is the feed rate of inert component S to the reaction vessel in units of mass per unit time.

One equation of type (1) is derived for each inert component included in the reaction mixture.

An equation for the initiator included in the reaction mixture is derived as follows:

$$\frac{d(\text{mass}(I))}{dt} = \text{Flow}(I) - k_d \times f_{cat\_eff}[I] \times \text{MW}_I \times \text{Volume} \tag{2}$$

wherein Flow(I) is the feed rate of initiator, $k_d$ is the initiator decomposition rate constant, $f_{cat\_eff}$ is the initiator efficiency, [I] is the initiator molar concentration in units of moles/liter, $\text{MW}_I$ is the initiator molar weight, and Volume is the sum of the volumes of all the components of the reaction mixture.

One equation of type (2) is derived for each initiator included in the reaction mixture.

An equation for the reactant monomers and crosslinking monomers included in the reaction mixture is derived as follows:

$$\frac{d(\text{mass}(M_j))}{dt} = \text{Flow}(M_j) - \tag{3}$$

$$\left( \sum_{i=all\_radical\_types} (k_{prop}(i,j) + k_{Tr\_Mon}(i,j)) \times \lambda_0 \times f(i) \times [M_j] \right) \times$$

$$\text{MW}_{M(j)} \times \text{Volume}$$

wherein Flow($M_j$) is the feed rate of monomer j, $k_{prop}(i,j)$ is the rate constant for a radical of type i adding monomer j, $k_{Tr\_Mon}(i,j)$ is the rate constant for a radical of type i transferring to monomer j, $\lambda_0$ is the overall radical concentration, f(i) is the fraction of radicals which is of type i, [$M_j$] is the molar concentration of monomer j and $\text{MW}_{M(j)}$ is the molar weight of monomer j.

One equation of type (3) is derived for each reactant monomer and crosslinking monomer included in the reaction mixture.

An equation for $\lambda_0$ included in each equation of type (3) is derived as follows:

$$\frac{d\lambda_0}{dt} = 2 \times k_d \times f_{cat\_eff} \times [I] - (k_{term,comb} + k_{term,disp}) \times (\lambda_0)^2 \tag{4}$$

wherein $k_{term,comb}$ and $k_{term,disp}$ are the rate constants for termination by combination and disproportionation, respectively; and the other variables are as defined above.

An equation for each f(i) term included in each equation of type (3) are determined using a set of equations (5) derived as follows:

Part A of the set is for monomer-based radicals which are located on chain ends. Equations derived for the $k^{th}$ monomer follow:

$$\sum_{j=all-radical-types-except-k} (k_{prop}(j,k) + k_{Tr\_Mon}(j,k)) \times [M_k] \times f(j) - \tag{5a}$$

$$f(k) \times \sum_{i=all\_CTA} k_{Tr\_A}(k,i) \times [CTA_i] -$$

$$f(k) \times \sum_{l=all-monomers-except-k} (k_{prop}(k,l) + k_{Tr\_Mon}(k,l)) \times [M_l] -$$

$$f(k) \times \sum_{m=dangling-DB} k_{prop}(k,m) \times [DB_m] = 0$$

wherein $k_{Tr\_A}(k,i)$ is the rate constant for a radical of type k transferring to a chain transfer agent of type i; $[CTA_i]$ is the molar concentration of chain transfer agent i; $[DB_m]$ is the molar concentration of pendant double bonds m; and the other variables are as defined above.

One equation of type (5a) is derived for each reactant monomer and crosslinking monomer included in the reaction mixture.

Part B of the set is for pendant double bonds which have reacted to become radicals. Equations derived for the $k^{th}$ pendant double bond follow:

$$\sum_{j=all-radical-types-except-k} (k_{prop}(j,k) + k_{Tr\_Mon}(j,k)) \times [DB_k] \times f(j) - \quad (5b)$$

$$f(k) \times \sum_{i=all\_CTA} k_{Tr\_A}(k,i) \times [CTA_i] -$$

$$f(k) \times \sum_{l=all-monomers-except-k} (k_{prop}(k,l) + k_{Tr\_Mon}(k,l)) \times [M_l] -$$

$$f(k) \times \sum_{m=dangling-DB-except-k} k_{prop}(k,m) \times [DB_m] = 0$$

wherein the variables are as defined above.

One equation of type (5b) is derived for each pendant double bond included in the reaction mixture.

Part C of the set is for chain transfer agents which have reacted to become radicals. Equations derived for the $k^{th}$ chain transfer agent follow:

$$\sum_{i=all-chain-end-radicals} k_{Tr\_A}(i,k) \times f(i) \times [CTA_k] + \quad (5c)$$

$$\sum_{j=all-dangling-DB-radicals} k_{Tr\_A}(j,k) \times f(j) \times [CTA_k] -$$

$$\sum_{l=all-monomers} k_{prop}(k,l) \times f(k) \times [M_l] +$$

$$\sum_{m=all-dangling-DB} k_{prop}(k,m) \times f(k) \times [DB_m] = 0$$

wherein the variables in equation (5c) are as defined above.

One equation of type (5c) is derived for each chain transfer agent included in the reaction mixture.

The equations of types (5a), (5b) and (5c) account for all of the radical types in the reaction mixture except for any initiator radicals.

An equation for the initiator radical fraction in the reaction mixture can be derived as follows from the condition $$\sum_{i=all-radicals} f(i) = 1. \quad (5d)$$

An equation for chain transfer agents in the reaction mixture is derived as follows:

$$\frac{d(mass(CTA_j))}{dt} = Flow(CTA_j) - \quad (6)$$

$$\left( \sum_{i=all\_radical\_types} k_{Tr\_A}(i,j) \times \lambda_0 \times f(i) \times [CTA_j] \times MW_{CTA(j)} \times Volume \right.$$

wherein $Flow(CTA_j)$ is the feed rate of chain transfer agent j; $MW_{CTA(j)}$ is the molar weight of chain transfer agent j; and the other variables are as defined above.

An equation for the volume of the reaction mixture is derived as follows:

$$Volume = \sum_{i=all-components} \frac{mass(i)}{d(i)} \quad (7)$$

wherein $d(i)$ is the density of component i.

Equations for the masses of the different kinds of polymer segments present in the reaction mixture may be derived as follows.

An equation for polymer segments which come from initiator fragments is derived as follows:

$$\frac{d(mass\_seg(I))}{dt} = 2 \times k_d \times f_{cat\_eff}[I] \times MW_{Init-frag} \times Volume \quad (8)$$

wherein $mass\_seg(I)$ is the mass of polymer segments from initiator fragments, $MW_{Init-frag}$ is the molar weight of the polymer segments from initiator fragments.

An equation for polymer segments which come from monomers that do not crosslink is derived as follows:

$$\frac{d(mass\_seg(M_j))}{dt} = \quad (9)$$

$$\sum_{i=all\_radical\_types} (k_{prop}(i,j) + k_{Tr\_Mon}(i,j)) \times \lambda_0 \times f(i) \times$$

$$[M_j] \times MW_{M(j)} \times Volume$$

wherein the variables are as defined above.

One equation of type (8) is derived for each reactant monomer included in the reaction mixture which does not crosslink.

Multiple equations can be derived for crosslinking monomers. Multiple equations may need to be derived for a given crosslinking monomer given that such monomers give rise to different types of polymer segments.

A general equation for polymer segments that come from crosslinking monomer, which can react further is derived as follows:

$$\frac{d(mass\_seg(DB_j))}{dt} = \quad (10a)$$

$$\left( \sum_{i=all\_radical\_types} (k_{prop}(i,j) + k_{Tr\_Mon}(i,j)) \times \lambda_0 \times f(i) \times [DBP_j] - \right.$$

$$\left. \sum_{i=all\_radical\_types} (k_{prop}(i,j) + k_{Tr\_Mon}(i,j)) \times \lambda_0 \times f(i) \times [DB_j] \right) \times$$

$$MW_{DB(j)} \times Volume$$

wherein $mas\_seg(DB_j)$ is the mass of polymer segments from crosslinking monomer that can react further of type j, $[DBP_j]$ is the molar concentration of $DB_j$ precursors, $MW_{DB(j)}$ is the molar weight of $DB_j$, and the other variables are as defined above.

An equation for polymer segments that come from crosslinking monomer, which cannot further react is derived as follows:

$$\frac{d(\text{mass\_seg}(DB_j))}{dt} = \sum_{i=\text{all\_radical\_types}} (k_{prop}(i,j) + k_{Tr\_Mon}(i,j)) \times \lambda_0 \times f(i) \times [DBP_j] \times MW_{DB(j)} \times \text{Volume}. \quad (10b)$$

wherein the variables are as defined above.

To further explain the derivation of equations (10a) and (10b), consider the crosslinking monomer TMPTA. TMPTA is a trifunctional crosslinking monomer. Accordingly, TMPTA would give rise to three types of polymer segments, namely $DB_2$ (i.e., a polymer segment with two pendant double bonds); $DB_1$ (i.e., a polymer segment with one pendant double bond) and $DB_0$ (i.e., a polymer segment with no pendant double bonds). Polymer segments of types $DB_2$ and $DB_1$ would be described by an equation of type 10a. Polymer segments of type $DB_0$ would be described by an equation of type 10b. Note that in the example using TMPTA as the crosslinking monomer, the precursor for a polymer segment $DB_2$ would be the crosslinking monomer TMPTA; the precursor for a polymer segment $DB_1$ would be $DB_2$; and the precursor for $DB_0$ would be $DB_1$.

A set of equations (1)-(10) may be derived for a given set of reaction conditions. These equations may then be solved and numerically integrated using the dynamic simulation tool (e.g., Aspen Custom Modeler®) to predict the standing monomer level at any time throughout the polymerization process in moles of standing monomer per kg of reaction mixture, B.

EXAMPLES

Some embodiments of the present invention will now be described in detail in the following examples.

Example 1

Prediction Method

A polymerization reaction to form crosslinked polymer particles at a solids level of about 45 wt % was simulated as follows:

The reaction conditions simulated included an overall reactant feed of 20 wt % acrylic acid (AA), 35 wt % butyl acrylate (BA), 35 wt % methyl methacrylate (MMA) and 10 wt % TMPTA with isopropanol as the solvent.

The values for A and C can be determined from the overall reactant feed as follows. The weight basis of the overall feed can be converted to a mol basis (assuming 100 grams total monomer) as follows:

Moles AA=20/72=0.2778;
Moles BA=35/128=0.2734;
Moles MMA=35/100=0.35; and,
Moles TMPTA=10/298=0.0336.

The sum of these values gives the total moles (assuming 100 grams total monomer) as 0.9348. Hence, the mol fractions of the various reactant monomers and crosslinking monomer were calculated as follows:

Mole fraction AA=0.2778/0.9348=0.2972;
Mole fraction BA=0.2734/0.9348=0.2925;
Mole fraction MMA=0.35/0.9348=0.3744; and,
Mole fraction TMPTA=0.0336/0.9348=0.0359.

Accordingly, A can be calculated for the simulated polymerization as follows:

$$A = 100 \ast (0.0359) \ast (3-1) = 7.18$$

Also, C can be determined from the foregoing to be the mole fraction of MMA which equals 0.3744.

The simulated polymerization reaction started with a reactor vessel containing 456 g of solvent isopropanol followed by a gradual addition of the reactant monomers and the crosslinking monomer as follows (in g/hr):

| | |
|---|---|
| acrylic acid (AA) | 25.21008 |
| butyl acrylate (BA) | 44.11764 |
| initiator | 5.0 |
| methyl methacrylate (MMA) | 44.11764 |
| isopropanol | 31.25 |
| TMPTA | 12.60504 |

The following initiator decomposition parameters were used in the equations, namely:

| | |
|---|---|
| $k_d$ | 2.8 hr$^{-1}$ |
| $f_{cat-eff}$ | 0.6 |

The following propagation rate constants were used in the equations (all in units of liter/{mol*hr}):

| Radical | Monomer Added | $k_{prop}$ |
|---|---|---|
| AA• or BA• | AA or BA | 2.034 × 10$^8$ |
| AA• or BA• | MMA | 6.78 × 10$^8$ |
| AA• or BA• | TMPTA monomer | 6.102 × 10$^8$ |
| AA• or BA• | TMPTA seg. (2)[1] | 4.068 × 10$^8$ |
| AA• or BA• | TMPTA seg. (1)[2] | 2.034 × 10$^8$ |
| MMA• | AA or BA | 3.24 × 10$^6$ |
| MMA• | MMA | 5.832 × 10$^6$ |
| MMA• | TMPTA monomer | 9.72 × 10$^6$ |
| MMA• | TMPTA seg. (2) | 6.48 × 10$^6$ |
| MMA• | TMPTA seg. (1) | 3.24 × 10$^6$ |
| All TMPTA•[3] | AA or BA | 1.8 × 10$^6$ |
| All TMPTA• | MMA | 5.4 × 10$^6$ |
| All TMPTA• | TMPTA monomer | 5.4 × 10$^6$ |
| All TMPTA• | TMPTA seg. (2) | 3.6 × 10$^6$ |
| All TMPTA• | TMPTA seg. (1) | 1.8 × 10$^6$ |
| Isopropyl alcohol• | All monomers | 3.6 × 10$^{10}$ |
| Initiator• | All monomers | 3.6 × 10$^{10}$ |

[1] TMPTA seg. (2) is a polymerized TMPTA segment with 2 unreacted double bonds
[2] TMPTA seg. (1) is a polymerized TMPTA segment with 1 unreacted double bond
[3] All TMPTA• is all TMPTA-based radicals All of the chain transfer to monomer rate constants, $k_{Tr\_mon}$, were taken to be equal to 1 liter/{mol*hr}.

The following chain transfer to isopropanol rate constants were used (all in units of liter/{mol*hr}) as follows:

| Radical | $k_{Tr-A}$ |
|---|---|
| AA• or BA• | 2.872 × 10$^5$ |
| MMA• | 1.114 × 10$^3$ |
| All TMPTA•[1] | 3. × 10$^3$ |

[1] Increasing $k_{Tr-A}$ to 3 × 10$^4$ had only a slight effect on the results.

All of the termination rate constants, $k_{term,comb}$, were taken to be equal to 3.6×10$^{11}$ liter/{mol*hr}.

All of the termination rate constants, $k_{term,disp}$, were taken to be equal to 1 liter/{mol*hr}.

The molecular weights of the various components in the simulated reaction mixture were taken as follows (in g/mol):

| | |
|---|---|
| AA | 72 |
| BA | 128 |
| Initiator | 172 |
| MMA | 100 |
| Isopropanol | 60 |
| TMPTA | 298 |
| AA segment | 72 |
| BA segment | 128 |
| Initiator segment | 86 |
| MMA segment | 100 |
| Isopropanol segment | 59 |
| All TMPTA segments | 298 |

The densities of the various components in the simulated reaction mixture were taken as follows (in g/cm³):

| | |
|---|---|
| AA | 1.05 |
| BA | 0.89 |
| Initiator | 0.9 |
| MMA | 0.94 |
| Isopropanol | 0.781 |
| TMPTA | 0.9 |
| AA segment | 1.22 |
| BA segment | 1.04 |
| Initiator segment | 1.1 |
| MMA segment | 1.18 |
| Isopropanol segment | 1.0 |
| All TMPTA segments | 1.04 |

Values for all of the above noted constants may be found in standard sources such as handbooks and the open literature. Notwithstanding, those skilled in the art will recognize that the values for such constants may be adjusted based on actual experimental observations. It is noted that the rates constants $k_d$, $k_{term,comb}$ and $k_{prop}$ for TMPTA homopolymerization were adjusted slightly based on the results obtained from an actual experiment run at 15 wt % solids.

A set of equations (1)-(10) derived as described in the specification given the simulated process parameters and rate constants noted above were entered into Aspen Custom Modeler® to predict that the maximum standing monomer level would occur at 45 minutes into the simulated feed and that the maximum standing monomer levels (in parts per million) would be as follows:

| | |
|---|---|
| AA | 19048. |
| BA | 33335. |
| MMA | 17909. |
| TMPTA | 4345. |

These simulated standing monomer levels can be converted to units, (mol DB/kg reaction mixture), by multiplying by a factor of $$\frac{\text{double\_bonds\_per\_monomer}}{1000 \times MW}$$

to give the following:

| | |
|---|---|
| AA | 0.2646 |
| BA | 0.2604 |
| MMA | 0.1791 |
| TMPTA | 0.0437 |

Hence, the value B for the simulated polymerization reaction may be calculated as follows:

B=0.2646+0.2604+0.1791+0.0437=0.7478 mol/kg of reaction mixture.

Thus, for the foregoing simulated polymerization process $A*B*C$=7.18*0.7478*0.3744=2.01<2.18

According to the prediction method of the present invention, the subject simulated polymerization reaction would not result in the formation of a gel. The subject simulated polymerization reaction was actually performed (see Example 9) and, as predicted by the prediction method of the present invention, was observed not to result in formation of a gel.

Examples 2-29

Polymerizations

The following examples were all performed using a 4 neck 3,000 mL round bottom flask as the reaction vessel. The subject flask was fitted with a water-cooled reflux condenser with a nitrogen purge gas outlet, a thermocouple attached to an I²R Tow TC Adapter Model TCA/1 temperature controller, a glass C-stirrer controlled by a Fisher Maxima™ digital stir motor and a monomer feed line controlled by a QG-50 FMI pump fitted with ¼ inch tubing. The contents of the reaction vessel were heated using a heating mantle connected to either a 120V Variac Type 3PN1010 model from Staco Energy Products or Type 3PN16C model from Superior Electric Company. All of the reactants used were weighed using a Metler PC 8000 balance.

The recipes, feed rates and polymerization times for the individual Examples are provided in Table 1.

The following basic procedure was used for each of individual Examples 2-29.

The heel charge was added to the reaction vessel and heated to 79° C. under a nitrogen sweep with water running through the condenser. Once at temperature, the reactant mix (reactant monomers, crosslinking monomer, initiator and additional solvent noted in Table 1) was fed to the reaction vessel at a constant rate over the feed period noted in Table 1.

A 5 mL sample was taken from the reaction vessel at 10 min, 15 min, and every subsequent 15 min. following the start of the reactant mix feed. These 5 mL aliquots of the reaction mixture were each drawn from the reactor with a Samco 263 transfer pipet and transferred to a 1 oz glass vial containing about 10 mg of MEHQ and then quenched in ice to stop further polymerization. At the end of the reactant mix feed, the reaction was held at temperature for an additional 30 minutes, and then the initiator chase noted in Table 1 was added as a shot and held for another 150 min at temperature.

The polymerizations performed in each of Examples 2-29 were observed to determine whether a gel formed. The results of these observations are provided in Table 2.

Also, all of the 5 mL samples drawn from the polymerization reactions performed in Examples 2-29 were each analyzed for standing monomer content by either head-space gas chromatography or liquid injection gas chromatography. The maximum standing monomer content measured for each of Examples 2-29 is reported in Table 2. The values for A and C for each of Examples 2-29 are also reported in Table 2 along with the product of A*B*C. Also, the solids content of each of the example polymerizations is reported in Table 2.

TABLE 1

| Ex. # | Reactants | mass (in g) | Feed Period (in min.) |
|---|---|---|---|
| 2 | Heel Charge | 456 | — |
|   | isopropanol | 456 g | |
|   | Reactant Mix | 645 | 238 |
|   | BA | 450 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 3 | Heel Charge | 456 | — |
|   | isopropanol | 456 g | |
|   | Reactant Mix | 645 | 238 |
|   | BA | 275 g | |
|   | MMA | 75 g | |
|   | AA | 100 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 4 | Heel Charge | 456 | — |
|   | isopropanol | 456 g | |
|   | Reactant Mix | 645 | 236 |
|   | BMA | 175 g | |
|   | BA | 175 g | |
|   | AA | 100 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 5 | Heel Charge | 773.6 | — |
|   | isopropanol | 773.6 g | |
|   | Reactant Mix | 645 | 255 |
|   | BA | 175 g | |
|   | MMA | 175 g | |
|   | AA | 100 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 6 | Heel Charge | 456.1 | — |
|   | isopropanol | 456.1 g | |
|   | Reactant Mix | 645 | 236 |
|   | BA | 150 g | |
|   | MMA | 150 g | |
|   | AA | 150 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 7 | Heel Charge | 2334 | — |
|   | isopropanol | 2334 g | |
|   | Reactant Mix | 571.5 | 110 |
|   | BA | 157.5 g | |
|   | MMA | 157.5 g | |
|   | AA | 90 g | |
|   | TMPTA | 45 g | |
|   | Triganox 125-75 (initiator) | 9 g | |
|   | isopropanol | 112.5 g | |
|   | Initiator chase | 9 | — |
|   | Triganox 125-C75 | 9 g | |
| 8 | Heel Charge | 446 | — |
|   | isopropanol | 446 g | |
|   | Reactant Mix | 645 | 236 |
|   | BA | 175 g | |
|   | MMA | 175 g | |

TABLE 1-continued

| Ex. # | Reactants | mass (in g) | Feed Period (in min.) |
|---|---|---|---|
|   | AA | 100 g | |
|   | TMPTA | 50 g | |
|   | Triganox 125-75 (initiator) | 30 g | |
|   | isopropanol | 115 g | |
|   | Initiator chase | 10 | — |
|   | Triganox 125-C75 | 10 g | |
| 9 | Heel Charge | 456 | — |
|   | isopropanol | 456 g | |
|   | Reactant Mix | 645 | 238 |
|   | BA | 175 g | |
|   | MMA | 175 g | |
|   | AA | 100 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 10 | Heel Charge | 1345 | — |
|   | isopropanol | 1345 g | |
|   | Reactant Mix | 645 | 247 |
|   | BA | 225 g | |
|   | MMA | 225 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 11 | Heel Charge | 456 | — |
|   | isopropanol | 456 g | |
|   | Reactant Mix | 645 | 236 |
|   | BA | 175 g | |
|   | MMA | 175 g | |
|   | AA | 100 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 12 | Heel Charge | 456 | — |
|   | isopropanol | 456 g | |
|   | Reactant Mix | 645 | 210 |
|   | BA | 175 g | |
|   | MMA | 100 g | |
|   | AA | 175 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 13 | Heel Charge | 436 | — |
|   | isopropanol | 436 g | |
|   | Reactant Mix | 645 | 195 |
|   | BA | 175 g | |
|   | MMA | 175 g | |
|   | AA | 100 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 14 | Heel Charge | 456.1 | — |
|   | isopropanol | 456.1 g | |
|   | Reactant Mix | 645 | 240 |
|   | BA | 225 g | |
|   | MMA | 175 g | |
|   | AA | 50 g | |
|   | TMPTA | 50 g | |
|   | Triganox 125-75 (initiator) | 20 g | |
|   | isopropanol | 125 g | |
|   | Initiator chase | 10 | — |
|   | Triganox 125-C75 | 10 g | |
| 15 | Heel Charge | 456.1 | — |
|   | isopropanol | 456.1 g | |
|   | Reactant Mix | 645 | 230 |
|   | LA | 175 g | |
|   | MMA | 175 g | |

TABLE 1-continued

| Ex. # | Reactants | mass (in g) | Feed Period (in min.) |
|---|---|---|---|
| | AA | 100 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 16 | Heel Charge | 773.6 | — |
| | isopropanol | 773.6 g | |
| | Reactant Mix | 645 | 252 |
| | BA | 225 g | |
| | MMA | 225 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 17 | Heel Charge | 446 | — |
| | MEK | 446 g | |
| | Reactant Mix | 645 | 236 |
| | BA | 175 g | |
| | MMA | 175 g | |
| | AA | 100 g | |
| | TMPTA | 50 g | |
| | Triganox 125-75 (initiator) | 30 g | |
| | isopropanol | 115 g | |
| | Initiator chase | 10 | — |
| | Triganox 125-C75 | 10 g | |
| 18 | Heel Charge | 461 | — |
| | isopropanol | 461 g | |
| | Reactant Mix | 645 | 236 |
| | BA | 175 g | |
| | MMA | 175 g | |
| | AA | 100 g | |
| | TMPTA | 50 g | |
| | Triganox 125-75 (initiator) | 15 g | |
| | isopropanol | 130 g | |
| | Initiator chase | 10 | — |
| | Triganox 125-C75 | 10 g | |
| 19 | Heel Charge | 466 | — |
| | isopropanol | 466 g | |
| | Reactant Mix | 571.5 | 240 |
| | BA | 157.5 g | |
| | MMA | 157.5 g | |
| | AA | 90 g | |
| | TMPTA | 45 g | |
| | Triganox 125-75 (initiator) | 10 g | |
| | isopropanol | 111.5 g | |
| | Initiator chase | 9 | — |
| | Triganox 125-C75 | 9 g | |
| 20 | Heel Charge | 456 | — |
| | isopropanol | 456 g | |
| | Reactant Mix | 645 | 238 |
| | BA | 275 g | |
| | MMA | 175 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 21 | Heel Charge | 456.1 | — |
| | isopropanol | 456.1 g | |
| | Reactant Mix | 645 | 120 |
| | BA | 175 g | |
| | MMA | 175 g | |
| | AA | 100 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 22 | Heel Charge | 456.1 | — |
| | isopropanol | 456.1 g | |
| | Reactant Mix | 645 | 236 |
| | BA | 175 g | |
| | MMA | 125 g | |
| | AA | 100 g | |
| | TMPTA | 100 g | |
| | Triganox 125-75 (initiator) | 20 g | |
| | isopropanol | 125 g | |
| | Initiator chase | 10 | — |
| | Triganox 125-C75 | 10 g | |
| 23 | Heel Charge | 456 | — |
| | isopropanol | 456 g | |
| | Reactant Mix | 645 | 238 |
| | BA | 225 g | |
| | MMA | 225 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 24 | Heel Charge | 456 | — |
| | isopropanol | 456 g | |
| | Reactant Mix | 645 | 236 |
| | BA | 200 g | |
| | MMA | 200 g | |
| | AA | 50 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 25 | Heel Charge | 456 | — |
| | isopropanol | 456 g | |
| | Reactant Mix | 645 | 236 |
| | BA | 175 g | |
| | MMA | 175 g | |
| | MAA | 100 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 26 | Heel Charge | 456.1 | — |
| | isopropanol | 456.1 g | |
| | Reactant Mix | 645 | 236 |
| | BA | 175 g | |
| | Styrene | 175 g | |
| | AA | 100 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 27 | Heel Charge | 456 | — |
| | isopropanol | 456 g | |
| | Reactant Mix | 645 | 238 |
| | BA | 225 g | |
| | MMA | 225 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 28 | Heel Charge | 456.1 | — |
| | isopropanol | 456.1 g | |
| | Reactant Mix | 645 | 236 |
| | MMA | 175 g | |
| | Styrene | 175 g | |
| | AA | 100 g | |
| | TMPTA | 50 g | |
| | Triganox 125-75 (initiator) | 20 g | |
| | isopropanol | 125 g | |
| | Initiator chase | 10 | — |
| | Triganox 125-C75 | 10 g | |
| 29 | Heel Charge | 456 | — |
| | isopropanol | 456 g | |
| | Reactant Mix | 645 | 238 |
| | BMA | 450 g | |
| | TMPTA | 50 g | |
| | Triganox 125-75 (initiator) | 20 g | |
| | isopropanol | 125 g | |

TABLE 1-continued

| Ex. # | Reactants | mass (in g) | Feed Period (in min.) |
|---|---|---|---|
| | Initiator chase | | 10 |
| | Triganox 125-C75 | 10 g | — |

TABLE 2

| Ex. # | gel | A | B | C | A * B * C | wt % solids |
|---|---|---|---|---|---|---|
| 2 | No | 9.11 | 0.3321 | 0.0000 | 0.0000 | 45 |
| 3 | No | 7.53 | 0.6244 | 0.1683 | 0.7917 | 45 |
| 4 | No | 8.07 | 0.4399 | 0.2965 | 1.0530 | 45 |
| 5 | No | 7.18 | 0.5843 | 0.3744 | 1.5707 | 35 |
| 6 | No | 6.82 | 0.8178 | 0.3047 | 1.6986 | 45 |
| 7 | No | 7.18 | 0.6685 | 0.3744 | 1.7972 | 15 |
| 8 | No | 7.18 | 0.7089 | 0.3744 | 1.9056 | 45 |
| 9 | No | 7.18 | 0.7271 | 0.3744 | 1.9547 | 45 |
| 10 | No | 8.04 | 0.4842 | 0.5388 | 2.0967 | 25 |
| 11 | No | 7.18 | 0.8100 | 0.3744 | 2.1774 | 45 |
| 12 | No | 6.54 | 1.0197 | 0.3412 | 2.2757 | 45 |
| 13 | No | 7.18 | 0.9124 | 0.3744 | 2.4528 | 45 |
| 14 | No | 7.68 | 0.8158 | 0.4005 | 2.5086 | 45 |
| 15 | No | 8.40 | 0.6868 | 0.4380 | 2.5261 | 45 |
| 16 | No | 8.04 | 0.6500 | 0.5388 | 2.8149 | 35 |
| 17 | Yes | 7.18 | 0.8144 | 0.3744 | 2.1893 | 45 |
| 18 | Yes | 7.18 | 0.8849 | 0.3744 | 2.3789 | 45 |
| 19 | Yes | 7.18 | 1.0216 | 0.3744 | 2.7464 | 45 |
| 20 | Yes | 8.25 | 0.8180 | 0.4304 | 2.9053 | 45 |
| 21 | Yes | 7.18 | 1.1544 | 0.3744 | 3.1033 | 45 |
| 22 | Yes | 15.46 | 0.7172 | 0.2879 | 3.1920 | 45 |
| 23 | Yes | 8.04 | 0.7983 | 0.5388 | 3.4571 | 45 |
| 24 | Yes | 7.58 | 1.0193 | 0.4520 | 3.4942 | 45 |
| 25 | Yes | 7.54 | 0.7144 | 0.6549 | 3.5297 | 45 |
| 26 | Yes | 7.28 | 1.5313 | 0.3653 | 4.0746 | 45 |
| 27 | Yes | 8.04 | 1.0063 | 0.5388 | 4.3579 | 45 |
| 28 | Yes | 6.73 | 1.2650 | 0.6880 | 5.8534 | 45 |
| 29 | Yes | 10.06 | 0.6336 | 0.9497 | 6.0513 | 45 |

We claim:

1. A method for predicting whether a selection of reaction conditions for a polymerization reaction for forming crosslinked polymer particles exhibit a potential for forming a gel; wherein the reaction conditions include a reaction mixture comprising at least one reactant monomer and at least one crosslinking monomer; wherein the at least one reactant monomer is selected from alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof; wherein the reaction conditions are selected to provide a polymerization reaction that is emulsion free; the method comprising:
predicting whether equation (1) will be satisfied at some point during the polymerization reaction given the selection of reaction conditions:

$$2.18 < A*B*C < 2.9 \tag{1}$$

wherein
A is the total fraction of potential pendant double bonds defined according to equation 2:

$$A = 100*(\text{overall mole fraction of cross linking monomer})*(N-1); \tag{2}$$

where N is the number of polymerizable double bonds per cross linking monomer;

B is the moles of standing monomer per kg of reaction mixture; and,
C is the overall mole fraction of methacrylate monomers, vinyl aromatic monomers, methacrylamide monomers, norbornene monomers and substituted norbornene monomers in the reaction mixture.

2. The method of claim 1, wherein the polymerization reaction yields a solids level of crosslinked polymer particles >40 wt %.

3. A method for predicting whether a selection of reaction conditions for a polymerization reaction will not result in the formation of a gel; wherein the reaction conditions include a reaction mixture comprising at least one solvent, at least one reactant monomer and at least one crosslinking monomer; wherein the at least one reactant monomer is selected from alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof wherein the reaction conditions are selected to provide a polymerization reaction that is emulsion free and that produces crosslinked polymer particles; the method comprising:
predicting whether equation (1) will be satisfied throughout the polymerization reaction given the selection of reaction conditions:

$$A*B*C < 2.18; \tag{1}$$

wherein
A is the total fraction of potential pendant double bonds defined according to equation 2:

$$A = 100*(\text{overall mole fraction of cross linking monomer})*(N-1); \tag{2}$$

where N is the number of polymerizable double bonds per cross linking monomer;
B is the moles of standing monomer per kg of reaction mixture; and,
C is the overall mole fraction of methacrylate monomers, vinyl aromatic monomers, methacrylamide monomers, norbornene monomers and substituted norbornene monomers in the reaction mixture.

4. The method of claim 3, wherein the polymerization reaction yields a solids level of crosslinked polymer particles >40 wt%.

5. A method for predicting whether a selection of reaction conditions for a polymerization reaction will result in forming a gel; wherein the reaction conditions include a reaction mixture comprising at least one reactant monomer and at least one crosslinking monomer; wherein the at least one reactant monomer is selected from alkyl (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers, vinyl imidazole, norbornene, substituted norbornenes, olefins and combinations thereof; wherein the reaction conditions are selected to provide a polymerization reaction that is emulsion free and that produces crosslinked polymer particles; the method comprising:
predicting whether equation (1) will be satisfied throughout the polymerization reaction given the selection of reaction conditions:

$$A*B*C > 2.9; \tag{1}$$

wherein
A is the total fraction of potential pendant double bonds defined according to equation 2:

$$A = 100 * (\text{overall mole fraction of cross linking monomer}) * (N-1); \quad (2)$$

where N is the number of polymerizable double bonds per cross linking monomer;

B is the moles of standing monomer per kg of reaction mixture; and,

C is the overall mole fraction of methacrylate monomers, vinyl aromatic monomers, methacrylamide monomers, norbornene monomers and substituted norbornene monomers in the reaction mixture.

* * * * *